US007075532B2

(12) United States Patent
Mukherjee et al.

(10) Patent No.: US 7,075,532 B2
(45) Date of Patent: Jul. 11, 2006

(54) ROBUST TETRAHEDRALIZATION AND TRIANGULATION METHOD WITH APPLICATIONS IN VLSI LAYOUT DESIGN AND MANUFACTURABILITY

(75) Inventors: Maharaj Mukherjee, Wappingers Falls, NY (US); Lewis William Dewey, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 10/249,982

(22) Filed: May 23, 2003

(65) Prior Publication Data

US 2004/0233191 A1    Nov. 25, 2004

(51) Int. Cl.
G06T 15/30 (2006.01)
G06T 17/00 (2006.01)
G06F 17/50 (2006.01)
G09G 5/00 (2006.01)

(52) U.S. Cl. ...................... 345/423; 345/428; 345/624; 716/20; 716/10

(58) Field of Classification Search ................ 345/423, 345/428
See application file for complete search history.

(56) References Cited

U.S. PATENT DOCUMENTS

| | | | | |
|---|---|---|---|---|
| 4,933,889 A | * | 6/1990 | Meshkat et al. ............... 716/20 |
| 5,428,717 A | * | 6/1995 | Glassner ...................... 345/423 |
| 5,553,009 A | * | 9/1996 | Meshkat et al. ............... 716/20 |
| 5,553,206 A | * | 9/1996 | Meshkat ....................... 345/423 |
| 5,751,591 A | * | 5/1998 | Asada ............................ 716/1 |
| 5,966,140 A | * | 10/1999 | Popovic et al. .............. 345/441 |
| 6,008,102 A | * | 12/1999 | Alford et al. ................. 438/381 |
| 6,046,744 A | * | 4/2000 | Hoppe ......................... 345/419 |
| 6,100,893 A | * | 8/2000 | Ensz et al. ................... 345/420 |
| 6,106,567 A | * | 8/2000 | Grobman et al. .............. 716/5 |
| 6,141,676 A | * | 10/2000 | Ramirez-Angulo et al. . 708/804 |
| 6,373,489 B1 | * | 4/2002 | Lu et al. ...................... 345/428 |
| 6,377,865 B1 | * | 4/2002 | Edelsbrunner et al. ........ 700/98 |
| 6,381,730 B1 | * | 4/2002 | Chang et al. ................... 716/5 |
| 6,526,549 B1 | * | 2/2003 | You ............................... 716/5 |

(Continued)

OTHER PUBLICATIONS

Mukherjee, M., "An efficient and simple polygon intersection algorithm", Proc. of First ACM Symposium on Solid Modeling Foundations and CAD/CAM Applications (Austin, Tx, Jun. 5-7, 1991), SMA '91, ACM Press, N. Y., NY.*

(Continued)

*Primary Examiner*—Ulka Chauhan
*Assistant Examiner*—Roberta Prendergast
(74) *Attorney, Agent, or Firm*—H. Daniel Schnurmann

(57) ABSTRACT

A tetrahedralization and triangulation method used with the proximity based rounding method to satisfy topological consistency of tetrahedralization with the bounded precision of a digital computer is described. Tetrahedralization is applied to a VLSI design, and more specifically for solving Maxwell's equation to extract parasitic capacitances and 3-D optical proximity correction applications. The exactness of solving Maxwell's equation and finite element analysis depends on the correctness of the topological properties of the tetrahedralization. Among the important aspects of the correctness of the topological properties is the absence of spurious intersection of two or more tetrahedra. In a typical digital computer, numbers are represented using finite sized words. Round-off errors occur when a long number is represented using the finite word size. As a result, tetrahedralization loses its topological consistency. The proximity based rounding method finds potential locations of spurious intersections and pre-corrects these locations to avoid the generation of any topological inconsistencies.

14 Claims, 16 Drawing Sheets

U.S. PATENT DOCUMENTS

| | | | | |
|---|---|---|---|---|
| 6,643,831 | B1* | 11/2003 | Chang et al. | 716/4 |
| 6,690,385 | B1* | 2/2004 | Mukherjee | 345/622 |
| 6,693,631 | B1* | 2/2004 | Hubeli et al. | 345/420 |
| 6,725,430 | B1* | 4/2004 | Draxler et al. | 716/1 |
| 6,760,023 | B1* | 7/2004 | Hubeli et al. | 345/420 |
| 6,806,874 | B1* | 10/2004 | Biermann et al. | 345/420 |
| 6,812,925 | B1* | 11/2004 | Krishnan et al. | 345/423 |
| 2002/0167513 | A1* | 11/2002 | Baraff et al. | 345/420 |
| 2003/0052875 | A1* | 3/2003 | Salomie | 345/419 |
| 2003/0151604 | A1* | 8/2003 | Kaufman et al. | 345/419 |

OTHER PUBLICATIONS

Christoph M. Hoffman, 37 The Problems of Accuracy and Robustness in Geometric Computation", IEEE, vol. 22, Issue 3, Mar. 1989, pp. 31-41.*

Christoph M. Hoffman, "Robust set operations on polyhedral solids", ☐☐ Computer Graphics and Applications, IEEE, vol. 9, Issue 6, Nov. 1989 pp. 50-59.*

Victor Milenkovic, "Double Precision Geometry: A General Tehnique for Calculating Line and Segment Intersections Using Rounded Arithmetic", IEEE, Fndns of Comp. Sci., 1989., 30th Ann'l Symposium, pp. 500-505.*

Victor J. Milenkovic, "Verifiable Implementations of Geometric Algorithms Using Finite Precision Arithmetic", Tech. Report CS-88-168, Carnegie Mellon Univ., Pittsburgh, Dec. 1987, pp. 378-401.*

Segal, M. and Séquin, C. H., "Consistent calculations for solids modeling", Proc. of the First Ann'l Symp. on Computational Geometry (Baltimore, Md, Jun. 5-7, 1985). ACM Press, NY, NY, 29-38.*

Jerke, et al., "Hierarchical Current Density Verification for Electromigration Analysis in Arbitrary Shaped Metallization Patterns of Analog Circuits", Proc. of Conference on Design, Automation and Test in Europe, 2002, IEEE Computer Society.*

Hoffmann, et al., "Towards implementing robust geometric computations", Proc. of the Fourth Annual Symposium on Computational Geometry, SCG '88, ACM Press, New York, NY, pp. 106-117.*

Segal, M., "Using tolerances to guarantee valid polyhedral modeling results", Proc. of the 17th Annual Conference on Computer Graphics and interactive Techniques, SIGGRAPH '90, ACM Press, New York, NY, pp. 105-114.*

Christoph M. Hoffmann, "The Problems of Accuracy and Robustness in Geometric Computation", IEEE, Mar. 1989, pp. 31-41.

Christoph M. Hoffmann et al., "Robust Set Operations on Polyhedral Solids", IEEE, Nov. 1989, pp. 50-59.

Victor Milenkovic et al. "Double Precision Geometry: A General Technique for Calculating Line and Segment Intersections Using Rounded Arithmetic", IEEE, 1989, pp. 500-505.

Victor J. Milenkovic, "Verifiable Implementations of Geometric Algorithms Using Finite Precision Arithmetic", MIT Press, Cambridge, Massachusetts, 1989, pp. 377-401.

Mark Segal et al., "Consistent Calculations for Solids Modeling", Computer Science Division, Department of Electrical Engineering and Computer Sciences, University of California, Berkeley, Mar. 1984, pp. 29-38.

Maharaj Mukherjee, "An Efficient and Simple Polygon Intersection Algorithm", The ACM Digital Library, Jul. 28, 2006, pp. 527.

* cited by examiner

ROBUST TETRAHEDRALIZATION AND TRIANGULATION METHOD WITH APPLICATIONS IN VLSI LAYOUT DESIGN AND MANUFACTURABILITY

BACKGROUND OF INVENTION

This invention is generally related to the design and manufacture of Very Large Scale Integrated circuits, and more particularly to a method for extracting parasitic capacitances from interconnect wiring thereof.

The method of tetrahedralization for 3-D objects has been studied extensively for a variety of engineering applications for a long time. With the advent of Computer Aided Design Tools (CAD) in both civil/mechanical designs automation and electronic design automation have created renewed interest in the development of efficient tetrahedralization methods. One limitation of the implementation of such methods using digital computers is the limitation imposed by the finite word sizes for both fixed point and floating point computations. Long numbers are either truncated or rounded off to fit into a bounded word size. As a result, the geometric and topological properties of the tetrahedralization are no longer satisfied. Tetrahedralization has been the subject of several patents.

By way of example:

U.S. Pat. No. 5,553,206 to Meshkat describes an algorithm to generate a mesh representation of an arbitrarily shaped object for applications such as finite element analysis. The method includes identifying elements of a mesh, such as a tetrahedral mesh, which are suitable, based on predetermined criteria, for merging into one of a predetermined set of target elements.

U.S. Pat. No. 6,133,921 to Turkiyyah et al. describes the construction of shape skeletons of 3-D objects using generalized Voronoi diagrams, refining it to reduce discretization errors.

U.S. Pat. No. 5,774,696 to Akiyama describes a finite difference method for refining a mesh to better follow the surface boundary.

An intersection between a substance boundary and triangles/tetrahedra meshes which satisfy the conditions of a Delaunay partition are eliminated.

U.S. Pat. No. 5,553,009 to Meshkat et al. describes a method of subdividing a curved solid into simple "cells", and arbitrarily shaped objects into a collection of geometric elements ("cells") having predefined simple topologies to facilitate further subdivisions into tetrahedra. This approach is well suited for other applications, such as finite element calculations.

None of the aforementioned patents address the round-off problem in tetrahedralization or numerical problems due to rounding errors.

Additionally, there have been several papers available in the open literature addressing this type of problems, some of which have attempted to handle round-off problems in the implementation of geometric algorithms.

Some researchers advocate computations in the exact precision domain, such as S. Fortune and V. Milenkovic, "Numerical stability of Algorithms for Line Arrangement Problems", ACM Symposium of Computational Geometry Proceedings, 1991, and C. Burnickel, K. Mehlhorn and S. Schirra , "On Degeneracy in Geometric Computations", Proceedings of the 5th ACM-SIAM Symposium on Discrete Algorithms, pp. 16–23, 1994. The proposed methods suffer serious drawbacks in that they become very slow when the size of computations increases, ending in a process that becomes soon unmanageable.

V. J. Milenkovic, in the paper "Verifiable Implementations of Robust Geometric Algorithms using Finite Precision Arithmetic", Carnegie Mellon University Technical Report CMU-CS-88-168, 1988, describes a method for intersecting lines in two dimensions. However, this approach introduces additional vertices and, hence, is more expensive.

D. H. Greene and F. F. Yao, in a paper "Finite Resolution Computational Geometry", published in the Proceedings of the Twenty-seventh Annual IEEE-FOCS Conference, pp.143–152, 1986, describe a method for intersecting lines in two dimensions. Again, this method is difficult to implement and is very slow. Further, this approach is limited to problems that do not involve any geometric decision making.

The limited use of diagonal wiring in VLSI chips has shown itself capable of improving chip performance by reducing net delay, a major component thereof being found to reside in the capacitive coupling between nets. An effective approach to handling wiring of all orientations is known as the finite element method. Practitioners of the art will recognize that the finite element method is best suited for modeling multiple dielectrics.

A tetrahedra mesh is recommended for 3-D finite element discretization. In the above application, a long wire is subdivided into small tetrahedra covering as closely as possible the volume and the surface of the wiring. In addition to that the spacing between different wires is also divided into tetrahedra for the finite-element analysis of the parasitic capacitances. In this manner, a problem in the continuous domain can be solved by techniques using discretized domains. Since the tetrahedralization of the continuous object is an approximation of the actual object, it is crucial that the fidelity of the approximation be high. In order to make a close approximation many tetrahedralization algorithms generate narrow and thin tetrahedrons.

An example of tetrahedralization is illustrated in FIG. 1. Shown therein are two wires crossing each other and the 3-D mesh generated between them for a finite element analysis of parasitic capacitances.

For the correctness of the extraction routine that uses tetrahedralization as a basis, it is essential that the exactness of the topology of the tetrahedrons be maintained. A topologically correct tetrahedralization without any spurious intersections among its components is known as a simplicial complex in three dimensions.

The topological correctness of the simplicial complex helps to establish a relationship between the continuous domain of the real object and its discretized tetrahedralization approximation. Without this consistency, analyses based on the tetrahedralization may give ambiguous results.

Many extraction algorithms incorporating the tetrahedralization algorithms therein are susceptible to round-off errors emanating from floating point computations. Errors are caused by the finite byte size used in a computer to store floating-point or fixed-point numbers. As a result of the finite byte size, numbers are truncated or rounded off at the end thereof. These truncations tend to accumulate over the complete set of computations, translating in the loss of precision of the numbers. By way of example, it is difficult to guarantee that two tetrahedra (adjacent or not) will not display a volume intersection because of numerical errors. Often, due to floating point errors, a tetrahedron or a surface thereof may lead to a topological inversion making it difficult to define the enclosed volume unambiguously. The problem of numerical imprecision is accentuated in 3-D tetrahedralization problems by the presence of very long and thin tetrahedra and acuteness of the component triangles.

FIG. 2 shows what typically happens when the space between the two wires becomes too small, wherein there is a tendency to generate sliver or small tetrahedra that are susceptible to numerical imprecision due to rounding errors.

For a typical simple tetrahedral mesh of VLSI layout, 2-dimensional shape coordinates are projected onto the x-y plane and 3-D prisms are extruded to fill the space between conductor shapes. Then prisms are split into tetrahedra. Shapes wherein the projections that come in close proximity without exactly meeting can result in a poor mesh quality. Thus, there is a need for a methodology that guarantees all the properties of a simplicial complex to be maintained in any tetrahedralization.

FIG. 3 illustrates the case of a 2-dimensional wiring consisting of two wires crossing each other diagonally. Shape projections that barely overlap one another, or shape projections that just miss touching result in flat tetrahedra. In the former case, the spacing between the two wires becomes very small, generating sliver tetrahedral in the region. Sliver tetrahedra are potentially problematic due to round-off errors. Moreover, depending on the direction of the overlap there may be little or no difference in one of their coordinates, leading to the formation of a flat tetrahedral. This effect is illustrated in FIG. 4 depicting 3-D top-down and isometric views of a typical VLSI layout where diagonal wiring is allowed.

As stated previously, when shape projections barely overlap one another as, for instance, near "A", the result is a sliver tetrahedra. Where shape projections just miss touching, e.g., near "B", the result is a nearly flat tetrahedra. Both slivers and nearly flat tetrahedra are poor mesh elements. Using the 3-D proximity based rounding method, environment A changes to A", with the three points near A merging into one, eliminating the sliver tetrahedra. Environment B changes to B", which eliminates the nearly flat tetrahedron and results in four triangular faces. In both cases, the 3-D proximity based rounding method improves the mesh.

FIG. 5 shows a typical case of parasitic capacitance extraction within which a tetrahedralization routine is used. Given an integrated circuit layout 501, regions of wire interactions 502 are first computed. These regions are used for computing tetrahedralization 503, and the result of this tetrahedralization is then employed for finite-element analysis 504. The output of the finite element analysis is instrumental in solving Maxwell's equation 505, and more specifically, for computing and extracting parasitic capacitances 506.

FIG. 6 shows the basic assumptions and a practical application of a tetrahedralization algorithm (shown in FIG. 5) within which the current state of the art is implemented. A polyhedron is first defined by its face edges and vertices 601. The input polyhedron for the case of parasitic capacitance extraction will become one of the regions of wire interactions. The input numerical values for vertices faces and edge equations for the input polyhedron are specified using integers or in terms of some bounded precision. Tetrahedralization is computed using a higher precision than the input precision 602, e.g., double-precision numbers, if the input was specified in integers. However, at the same time, these higher precision numbers are rounded to the closest integer points 603. Finally, the result represented with integer numerical values is generated at the output 604.

FIG. 7 is a current state of the art flow chart. The input of the program is a set of 3-D shapes 702 given in integer coordinates. The methodology then computes the tetrahedralization using double precision 703. The vertices and numerical coefficients of faces and edges of a tetrahedron defined using double precision are referred to as being unrounded, since they are eventually "rounded" to the closest integer grid point. Next, the method rounds the coordinates back to single precision integers 704 and outputs the results 705. The problem with rounding is described in the following two examples in conjunction with corresponding FIGS. 8 and 9. For the case described hereinafter, rounding causes spurious,intersection or topological inversion resulting in volume conflicts (i.e., a positive volume tetrahedron being transformed into a negative volume tetrahedron).

FIG. 8 shows a current state of the art process illustrating the methodology described in FIG. 7. Two tetrahedra 801 and 802 are shown sharing a common vertex 803. When the vertex 803 is rounded to its closest integer-grid point 806, tetrahedron 801 is transformed into tetrahedron 804, and tetrahedron 802 into tetrahedron 805. Tetrahedra 804 and 805 intersect each other, violating topological consistencies. For correct computation of Maxwell's equation, it is important that no two tetrahedra intersect. The above rounding violates this assumption.

FIG. 9 illustrates a case that was created by the prior art flow chart depicted in FIG. 7. Shown therein are two tetrahedra 901 and 902 sharing a common plane "C". When vertex 903 belonging to tetrahedron 902 is approximated to its closest integer-grid point 906, tetrahedron 901 is transformed into tetrahedron 904, while tetrahedron 902 is transformed into tetrahedron 905. Both 904 and 905 intersections violate topological consistencies with the volume enclosed by 905 becoming a negative volume that is partly enclosed by tetrahedron 904, creating a topological inversion. For correct computation of Maxwell's equation, it is important that the volume enclosed by each tetrahedron remain positive. The rounding in the present example violates this basic assumption.

FIG. 10 illustrates a finite precision computer to implement the present invention. It consists of a Central Processing Unit 1001, an Input-Output (IO) unit 1002, a communication interface 1003 and a Memory 1004. Data consists of a finite number of bytes 1006 handled by bus 1005. As a result, any number not sufficiently long to be represented by a word size is either truncated or rounded off.

Therefore, the longer the size of the word, the more precise the representation of the object in the computer. This truncation does not guarantee satisfaction of topological properties listed above, and further it has a negative impact on downstream applications.

When the current state of the art tetrahedralization algorithm illustrated in FIG. 7 is implemented within a digital computer as shown, e.g., in FIG. 10, spurious intersections or volume inversions are obtained, similar to the shapes illustrated in FIGS. 8 and 9, respectively.

SUMMARY OF INVENTION

Accordingly, it is an object of the invention to prevent topological inconsistencies in the process of tetrahedralization by way of eliminating spurious intersections among two or more tetrahedra and preventing volume inversion for each of the 3-D solid objects.

It is another object to represent the final output of the tetrahedralization by using limited precision defined within a digital computer.

It is yet another object to facilitate the computation of Maxwell's equation for parasitic capacitance extraction for a VLSI Chip design IC layout by creating valid 3-D tetrahedralization of interconnect wiring.

It is still another object to ensure topological consistency at the output tetrahedralization by making use of a higher precision at the intermediate stages of the computation.

The foregoing and other objects of the invention are provided by a method for preventing spurious intersections in a tetrahedralization a 3-D solid object representation due to round-off effects that includes the steps of: a) inputting the 3-D solid object representation with a first order precision; b) performing the tetrahedralization of the 3-D solid object representation with a second order precision, the second order precision being greater than the first order precision, the tetrahedralization generating a plurality of tetrahedra approximating the (3-D) solid object representation; c) identifying from the plurality of tetrahedra those tetrahedra showing spurious intersections between at least two tetrahedra from the plurality of tetrahedra; d) replacing the identified tetrahedra displaying the spurious intersections by other tetrahedra that are devoid of spurious intersections; e) converting all of the tetrahedra created by the tetrahedralization from the second order precision to the first order precision; and f) outputting with the first order precision the 3-D solid object representation consisting of tetrahedra devoid of spurious intersections.

The present invention assumes that all computations are performed in a computer having a bounded precision, namely, the computer that uses a finite number of bytes for representing a number for any intermediate computations. This scenario, which applies to the case where an input object is given in some bounded precision, is known to apply to many VLSI design applications. The output is also represented having the same precision. However, the intermediate tetrahedralization is computed using a higher precision than the input or the output precision. That is, the intermediate computation uses more bytes for representing numbers. Eventually, they are rounded to the lower precision of the output. In this way, the precision or the byte requirements for any further downstream computation can be kept bounded. In such an environment, when the output from the intermediate computations is computed, it is performed in such a way that the topological fidelity of the simplicial complex of the output tetrahedralization remains intact. This ensures that no tetrahedron will have any inversion of volume or spurious intersections.

The process of the present invention first identifies edges, faces and vertices of the intermediate tetrahedralization that are candidate for potential hazardous situations, such as spurious intersection or volume inversions. Neighboring shapes are then identified to determine which may adversely interact. Then, the edges, faces or tetrahedra are broken up or merged to create a well-conditioned situation that does not result in spurious intersections after being rounded.

BRIEF DESCRIPTION OF DRAWINGS

The present invention will be described such that these and other objects, aspects and advantages of the invention will become apparent from the detailed description of the invention when taken in conjunction with the accompanying drawings, in which:

FIGS. 15–16 illustrate the case of a nearly flat tetrahedron, wherein FIG. 15 illustrates the initial tetrahedral, and FIG. 16 is a continuation of FIG. 15 illustrating edges and vertices added in accordance with the present invention.

DETAILED DESCRIPTION

The present invention is based on the Proximity Based Rounding method designed to handle 3-D meshes in the following manner:

1. To reduce the amount of storage required (e.g., 32-bit integer coordinates used instead of 64-bit floating point numbers);
2. To eliminate the need for CPU intensive extended precision coordinate operations; and
3. To eliminate sliver or flat tetrahedra results in a mesh with a better condition number, resulting in less numerical error for both direct and indirect methods of finite element analysis and for their faster convergence for iterative.

Figure 7:
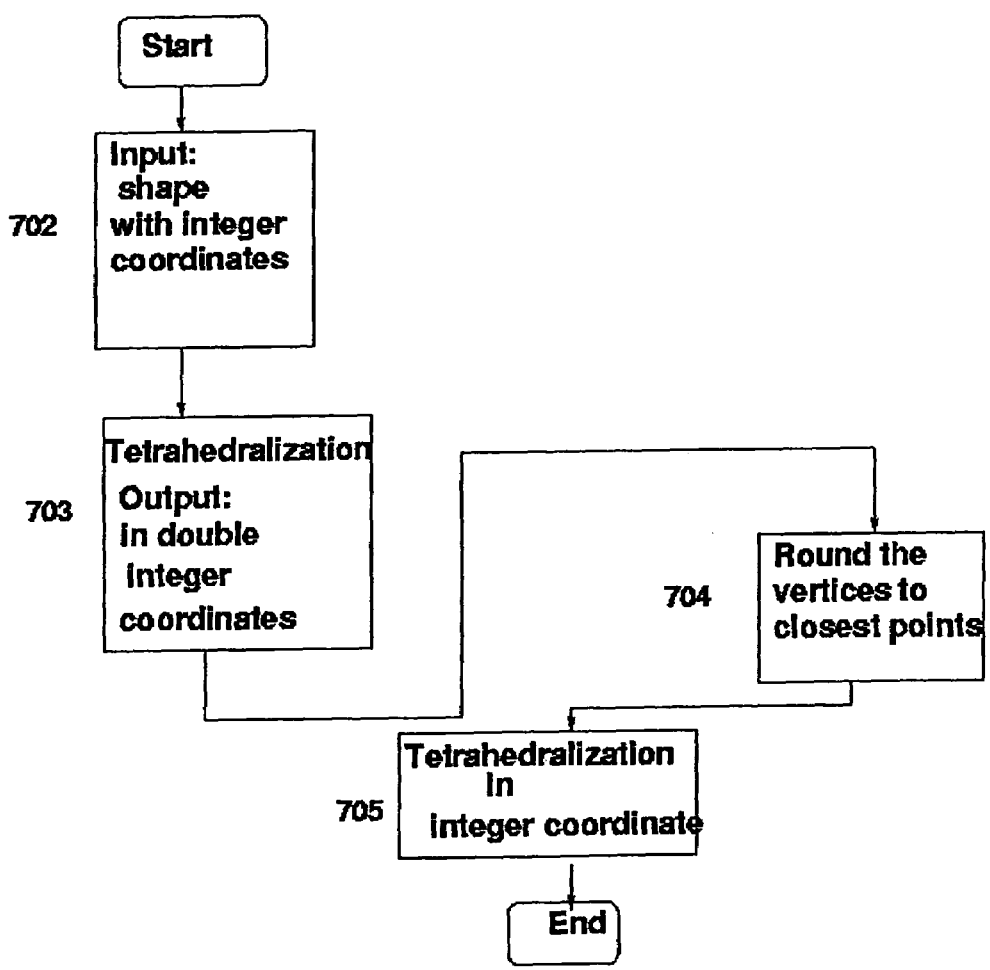
FIG. 7 illustrates a low chart of the current state of the art to highlight the presence of the problem addressed by the present invention.
Figure 8:
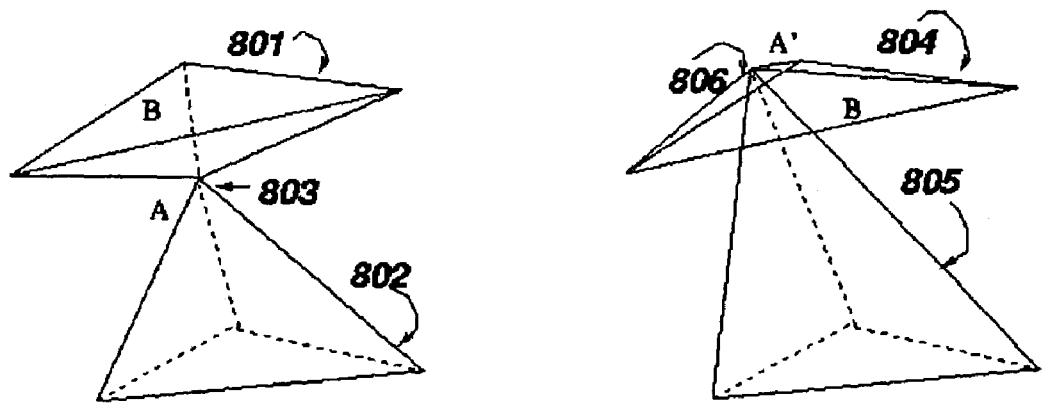
FIGS. 8 and 9 illustrate two examples addressed by the prior art with reference to the method depicted in FIG. 7.
Figure 9:
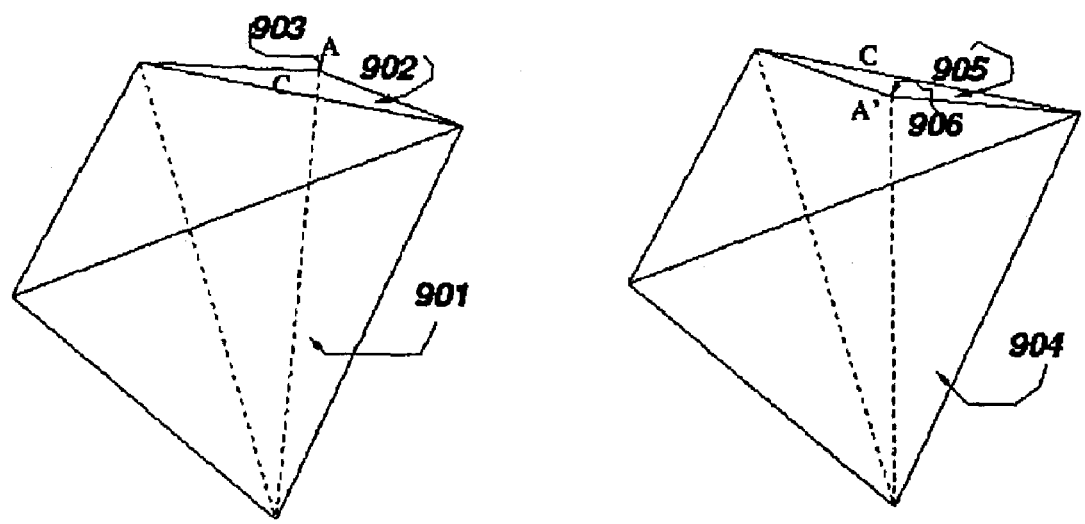
Figure 10:
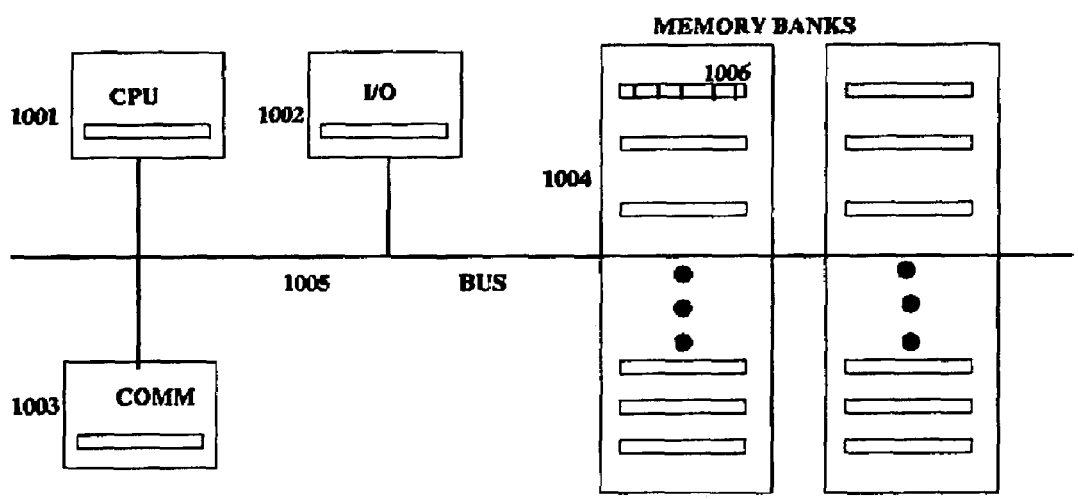
FIG. 10 shows a finite precision computer highlighting the problem solved by the present invention.
Figure 11:
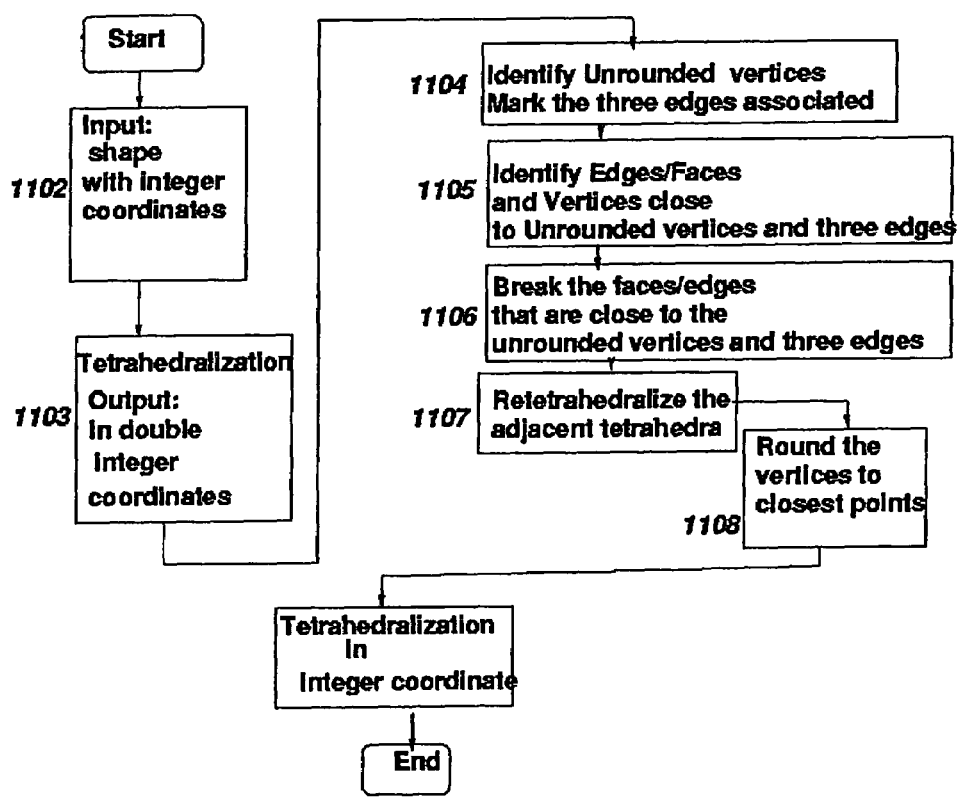
FIG. 11 is a flow chart depicting the method utilized for solving the above described problems, in accordance to an embodiment of the present invention.

The preferred embodiment of the current methodology is illustrated in FIG. 11. Therein, the current state of the art as defined in FIG. 7 is extended by a novel approach depicted in boxes 1104 through 1108.

Figure 1:
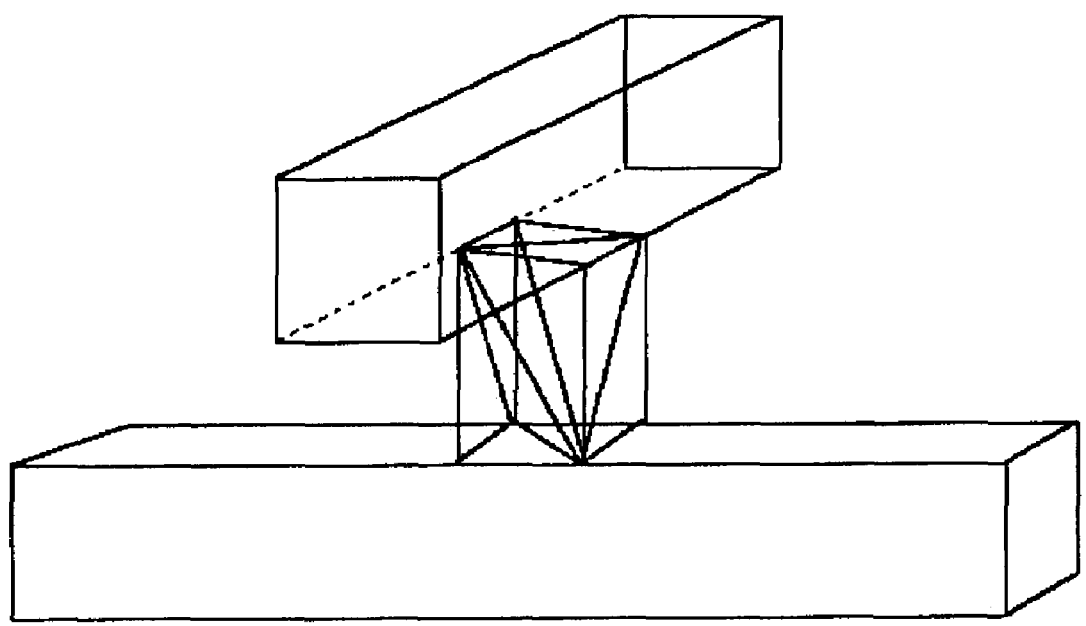
FIG. 1 shows two wires crossing each other and the 3-D mesh generated there between for a prior art finite element analysis of parasitic capacitances.
Figure 2:
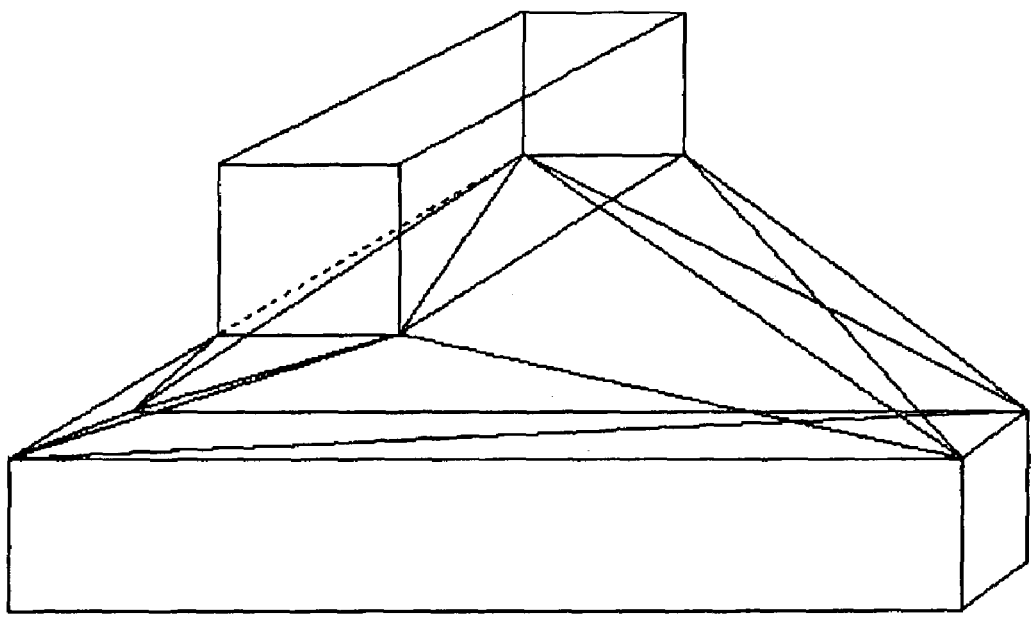
FIG. 2 illustrates an example where the space between two wires becomes too small, leading to the generation of sliver or small tetrahedra that are susceptible to numerical imprecision in the presence of round-off errors.
Figure 3:
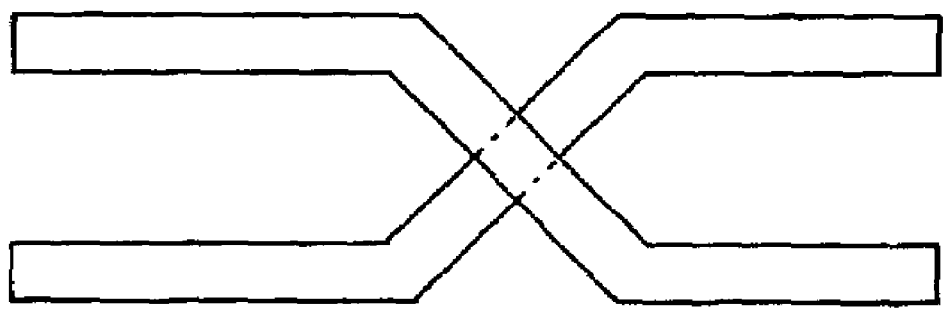
FIG. 3 shows a conventional wiring of two wires crossing each other diagonally.
Figure 4:
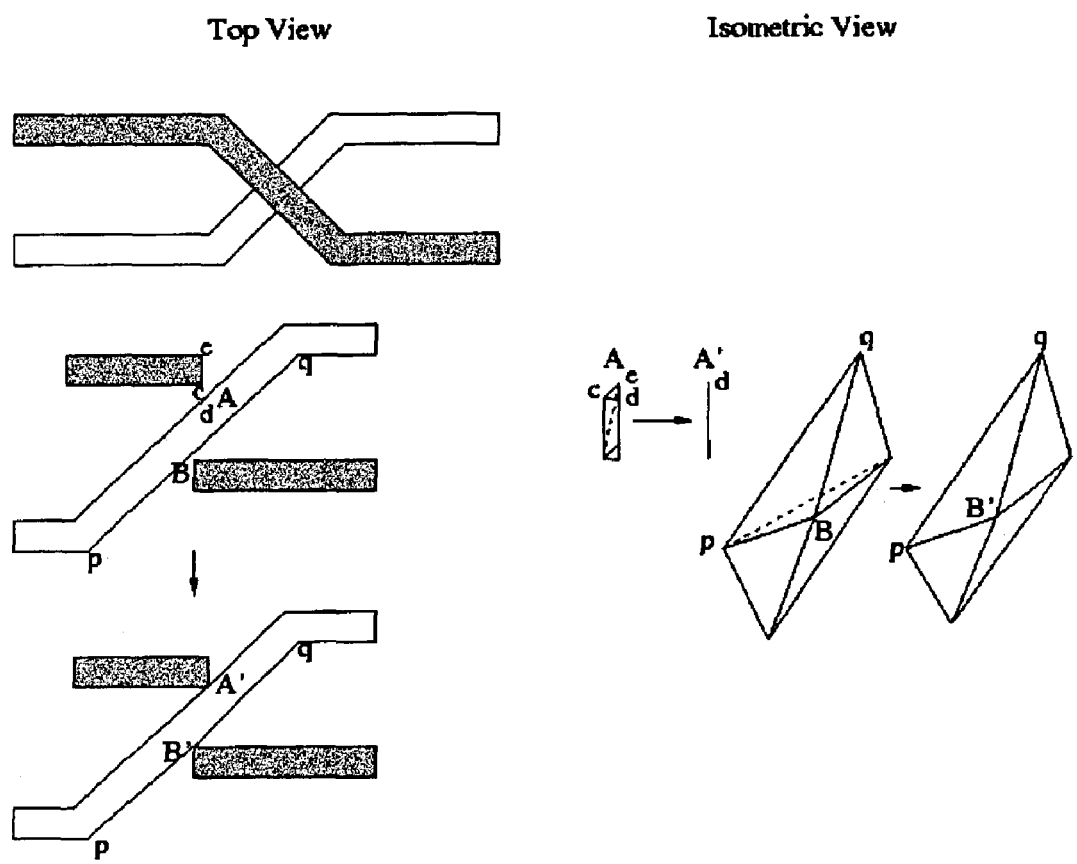
FIG. 4 are top-down and isometric views of a typical VLSI layout where diagonal wiring is allowed and where shape projections barely overlap one another, or just miss touching one another, the result of which is a flat tetrahedron.
Figure 5:
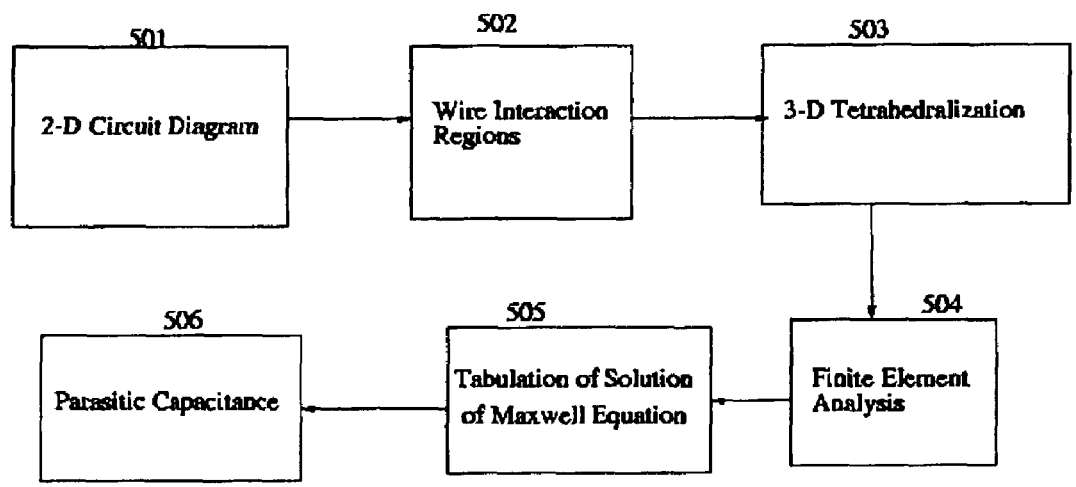
FIG. 5 shows an example of parasitic capacitance extraction within which a tetrahedralization routine is used.
Figure 6:
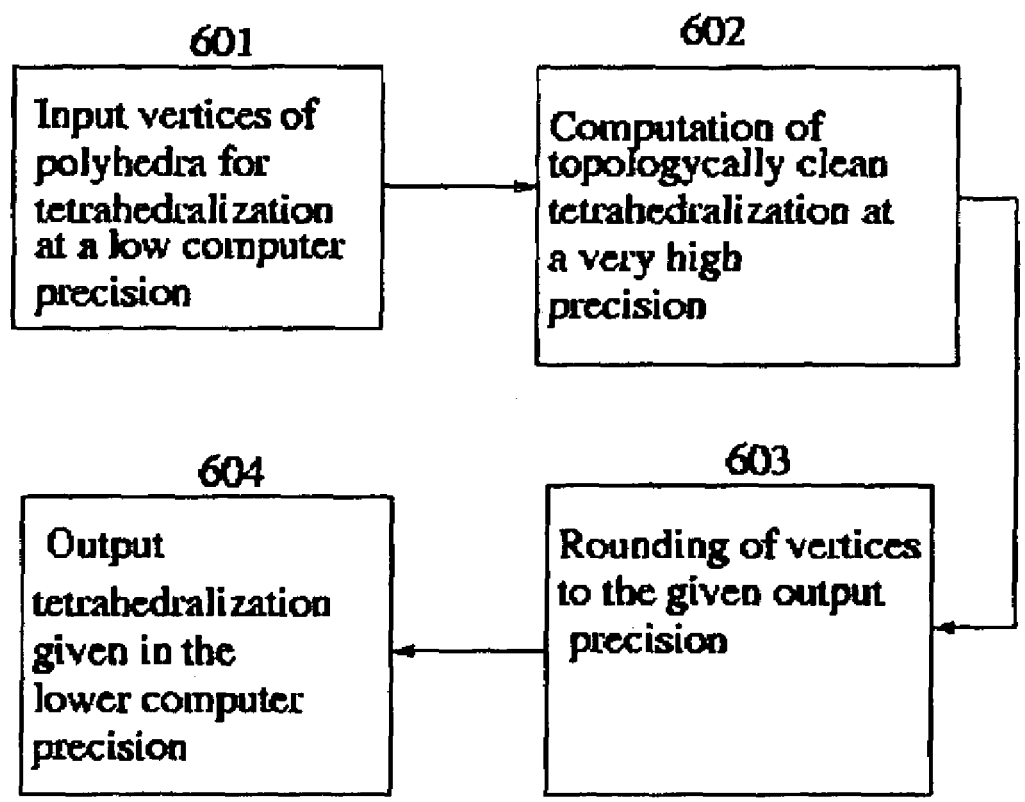
FIG. 6 illustrates some of the basic assumptions applicable to the process of tetrahedralization for extracting parasitic capacitance to the example shown in FIG. 5.

Referring back to FIG. 6 that illustrates some basic assumptions applicable to the process of tetrahedralization for extracting parasitic capacitance, there is shown a numerical representation of a 3-D input object obtained at a given computer precision (input precision). This representation satisfies the following assumptions:

1. The representation defines a valid boundary in the absence of any spurious intersections;
2. The 3-D object does not contain any degenerate edges, faces or vertices;

3. The volume defined by the representation is fully contained within its defined boundary;
4. The volume of the object and its boundary are finitely defined; and
5. The numerical representation of the object is defined using bounded precision.

A valid tetrahedralization of the input object is then computed at a higher computer precision than the "input" precision. The computed tetrahedralization satisfies the following properties.
i. Two tetrahedra do not intersect or they do not share any common volume;
ii. Each tetrahedron encloses a volume in its interior (i.e., positive volume);
iii. Two adjacent tetrahedra only share a common surface, that surface being a triangle;
iv. No two surface triangles intersect each other;
v. Two adjacent triangles share a common edge; and
vi. The numerical representation of the tetrahedralization contains sufficient precision to ensure that all the above properties are correct.

Next, the computed tetrahedralization is approximated by way of a valid tetrahedralization, the latter being represented in the "input" precision. This is achieved by the proximity based rounding illustrated in FIG. 11. The final object is defined at the input precision and is devoid of topological inconsistencies.

The preferred embodiment illustrated in FIG. 11 will be described hereinafter. The algorithm starts with a set of 3-D geometric objects, as shown in step 1102. The geometric objects are represented by key components such as faces, edges and vertices, also including connectivity information among different components. The connectivity information includes.
1. Edges belonging to a face and the faces associated with an edge. (Note that an edge can be associated with multiple faces and vice-versa);
2. Vertices belonging to a face and faces associated with a vertex. (Note that a vertex can be associated with multiple faces and vice-versa); and
3. Vertices belonging to an edge and edges associated with a vertex. (Note that a vertex can be associated with multiple edges, but an edge can have only two vertices).
In addition.
1. Each vertex is specified by its x, y, z coordinates;
2. Each edge is specified by its line equation given as:

$(x-x1)/a=(y-y1)/b=(z-z1)/c$, wherein x1, x2, x3 and a, b, c are numerical variables; and
3. Each face is specified by the face equation $Ax+By+Cz=D$, wherein A, B, C, and D are numerical variables. All numerical variables are denoted by way of integers or fixed precision numbers.

Note that although the present invention is described in terms of integers, the invention also anticipates cases which are implemented in a digital computer whose internal representation of numerical variables are performed using any fixed precision words or bytes.

The next step relates to computing the tetrahedralization, as shown in step 1103. Numerical computations involving computation of intersections of two faces to create a new edge are incorporated therein, as well as the intersection of three faces to create a new vertex, the intersection of two edges to create a new vertex, combining three edges to create a new face, and combining three vertices to create a new face. The output at this stage satisfies all the geometric and numerical properties described in step 1102. In addition, the output of this step is assumed to be a valid tetrahedralization defined in double precision.

Step 1103 uses double precision numbers to avoid numerical problems. In a standard digital computer, the number of bits representing a double precision number is eight times the number of bits representing an integer. The larger size of the double precision number ensures that, if the numerical variables described in box 1102 are represented by a finite word size "q", then, the current step 1103 will require to be implemented using a word having a size of 8q.

The description of the proximity based rounding is provided in steps 1104 through 1108 (FIG. 11).

Step 1104 involves finding all the unrounded vertices. Note that unrounded vertices are defined using double precision numbers.

They are called unrounded because they are eventually "rounded" to the closest integer grid point. In step 1104, a search is performed to find the newly created vertices obtained from step 1103, and marking all the vertices that are represented with double precision numbers.

Step 1105 finds the edges, faces and vertices that are close to the three edges associated with the unrounded vertex. Closeness is defined in the following manner.

For each unrounded vertex identified in step 1104, the following operations are performed.

First, the unit grid box surrounding the unrounded vertex is identified. For an unrounded vertex having coordinates (x, y, z), the closest integer-grid points is given as (X, Y, Z), where X, Y, Z are all integer such that;

abs(x-X) ≤0.5, abs(y-Y) ≤0.5, abs(z-Z) ≤0.5.

Next, the integer cube centered at integer-grid point (X, Y, Z) is obtained. The unit cube is defined by the set of points;

(p, q, r)|abs(p-X) ≤0.5, abs(q-Y) ≤0.5, abs(r-Z) ≤0.5.

Alternatively, the unit cube is defined by two points: (X−0.5, Y−0.5, and Z−0.5) and (X+0.5, Y+0.5, Z+0.5).

Next, the edges and faces intersecting the unit cube are obtained.

The faces intersecting the integer grid defined above satisfy the equation;

$abs(AX+BY+CZ+D)/abs(A+B+C)<⅓$.

Here the equation of the face is given by Ax+By+Cz=D and (X, Y, Z) as the integer grid point defined above for a particular unrounded vertex. Abs(á) denotes an absolute function.

If two faces satisfy the above equations, then the edge formed by their intersection will also intersect the integer cube. All the faces intersecting the integer cube are identified and marked accordingly. A search of all the adjacent faces is performed to mark the edges that intersect an integer cube.

In step 1106, edges and faces are broken down, as it was done in the previous step 1105 intersecting the unit grid box at the center of the unit grid box. For each face, this is achieved by finding the foot print (projection) of the center of the integer grid box on each of the faces passing through that integer grid box. For a center given as (X, Y, Z), the foot print on the plane Ax+By+Cz=D is determined by the coordinates (Foot_x, Foot_y, and Foot_z) wherein:

$Foot\_x=X-A(AX+BY+CZ-D)/(A^2+B^2+C^2)$;

$Foot\_y=Y-B(AX+BY+CZ-D)/(A^2+B^2+C^2)$; and $Foot\_z=Z-C(AX+BY+CZ-D)/(A^2+B^2+C^2)$.

The foot print of point (x, y, z) on a face defines the closest point on the face to the given point. In the present step, the foot print on the above face is first identified. Each of the triangular faces is then broken down into three triangles. Each triangle has the foot print as one of the vertices. The remaining two vertices originate from the initial triangular face.

In step 1107, new tetrahedra are created and are broken down into faces and edges. In the previous step 1106, a face was broken into three triangles using the footprint. Note that the tetrahedron consists of four vertices and four faces, and each of these faces consists of three vertices. Therefore, for each face of the tetrahedron there is just one vertex in the tetrahedron that does not belong to that face. This vertex is referred to as the Opposite Vertex for that face. In the present step 1107, the footprint for the face broken above is connected to the opposite vertex (vertex not belonging to the broken face) by a straight line. Each of the triangles created in Step 1106 connected to the opposite vertex creates a new tetrahedron. In this manner, three tetrahedra are created for each tetrahedron having a broken face.

Steps 1104 through 1107 are then repeated for all the unrounded vertices generated in step 1104. Finally, all the unrounded vertices are rounded to the center of the unit grid box (Step 1108). This is done by rounding each double precision number to the nearest integer grid point.

Figure 12:
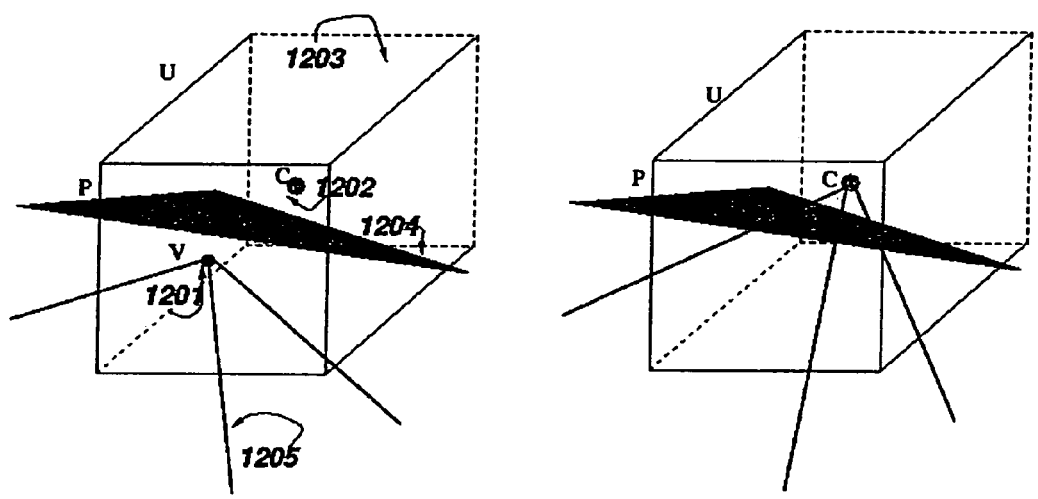
FIG. 12 illustrates how the vertex of a tetrahedron when rounded to the closest integer point may intersect the surface of another tetrahedron. The figure on the left illustrates an unrounded vertex and its closest integer-grid point and the integer cube centered at the integer-grid point, and the figure on the right shows a spurious intersection with the plane.
Figure 13:
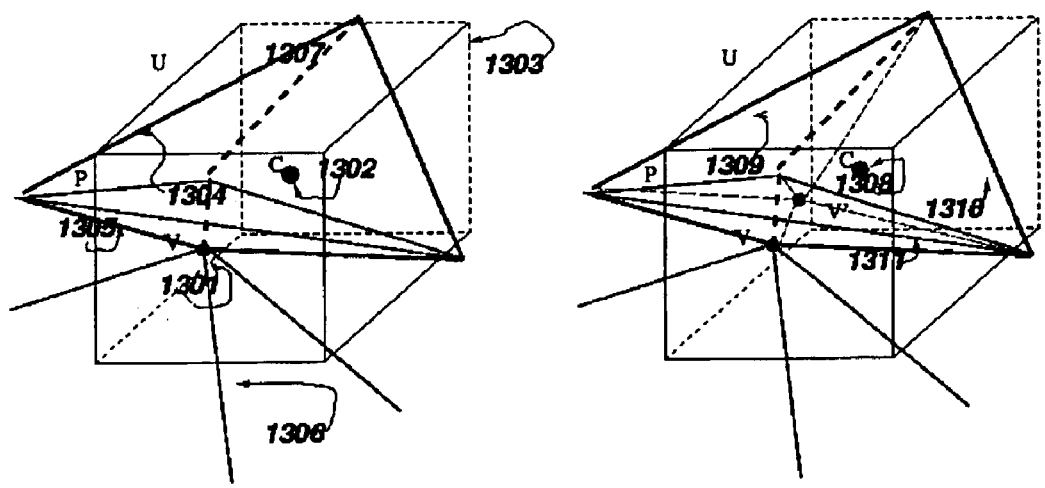
FIG. 13 is a continuation of FIG. 12 illustrating the solution resolved by proximity based rounding, in accordance with another aspect of the invention.
Figure 14:
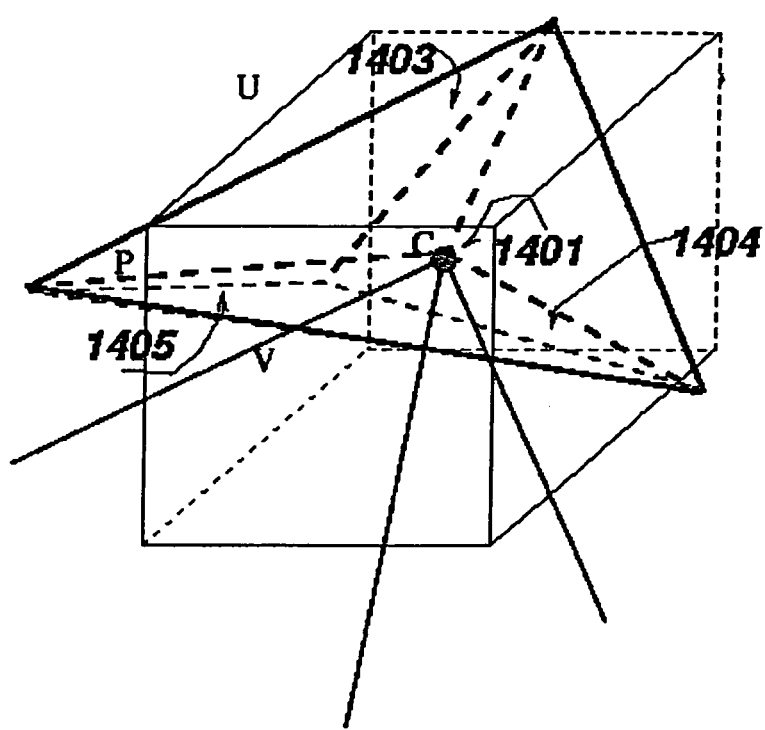
FIG. 14 illustrates a further continuation of the example illustrated in FIG. 13.

The above methodology will now be further illustrated by using an example shown in FIGS. 12 through 17, while FIGS. 12 through 14 will illustrate how the Proximity Based Rounding method works for a face.

FIG. 12 illustrates steps 1104 and 1105 of the preferred embodiment. This figure consists of two parts. The one on the left shows an unrounded vertex 1201, its closest integer-grid point 1202, and the integer cube 1203 centered at the integer-grid point. It also illustrates plane 1204 intersecting the integer cube and part of tetrahedron 1205 associated with vertex 1201. Identification of all planes and edges traversing the integer grid point associated with an unrounded vertex is obtained by performing a simple search of all the edges and faces of the unrounded tetrahedralization.

The FIG. 13 illustrates steps 1105 and 1107 of the preferred embodiment. This figure is a continuation of the example shown with reference to FIG. 12. FIG. 13 consists of two parts. The one on the left depicts an unrounded vertex 1301, its closest integer-grid point 1302 and the integer cube 1303 centered at the integer-grid point. It also illustrates plane 1304 passing through the integer cube and part of a tetrahedron 1305 associated with vertex 1301. The two tetrahedra associated with the plane 1304 are 1306 and 1307. The figure on the right illustrates vertex 1301 embedded into vertex 1308 on the plane 1304 passing through the integer grid point. Consequently, the tetrahedron 1308 is divided into three tetrahedra, i.e., 1309, 1310 and 1311.

FIG. 14, illustrating step 1108 of the preferred embodiment, is a further continuation of the example previously discussed with reference to FIGS. 12 and 13. Therein is shown an unrounded vertex rounded to its closest integer-grid point 1401. The associated tetrahedron is divided into three tetrahedra 1403, 1404 and 1405, thereby avoiding any spurious intersections.

Figure 15:
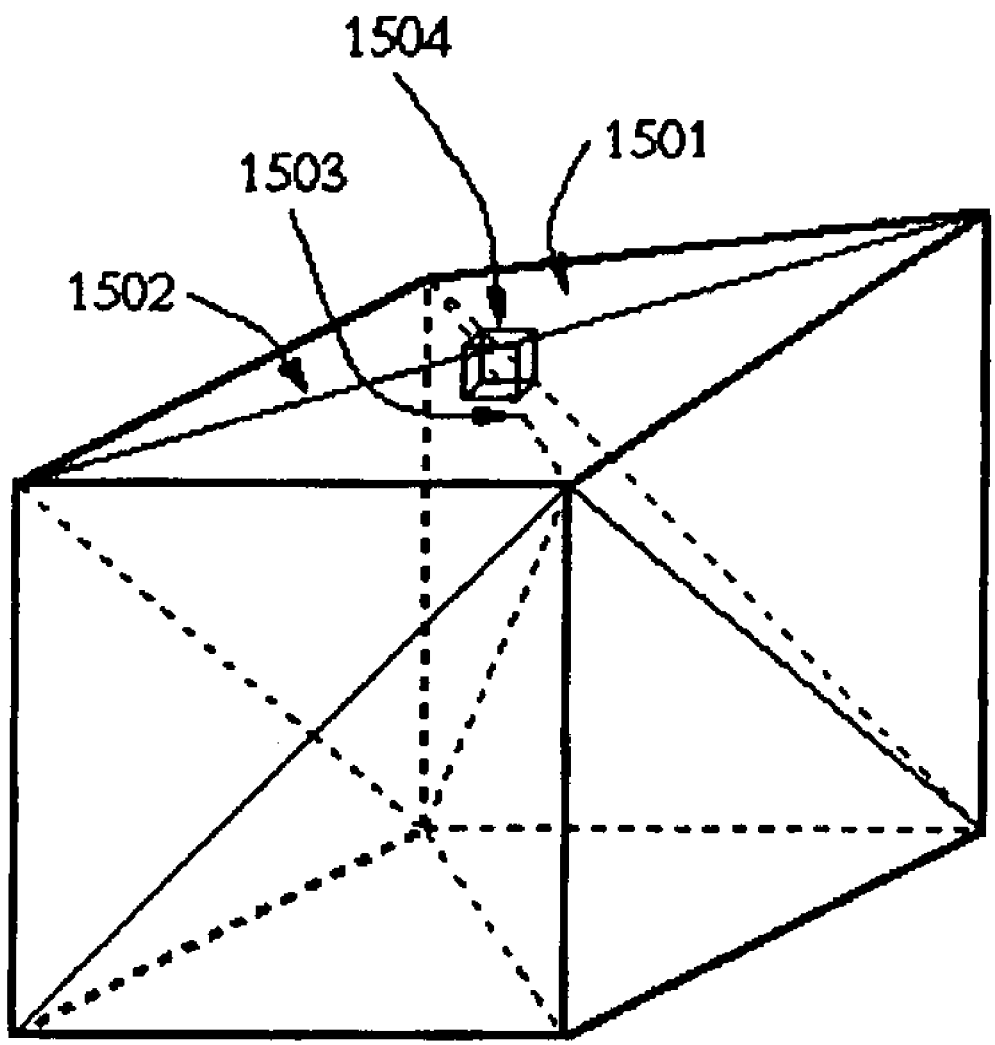
Figure 16:
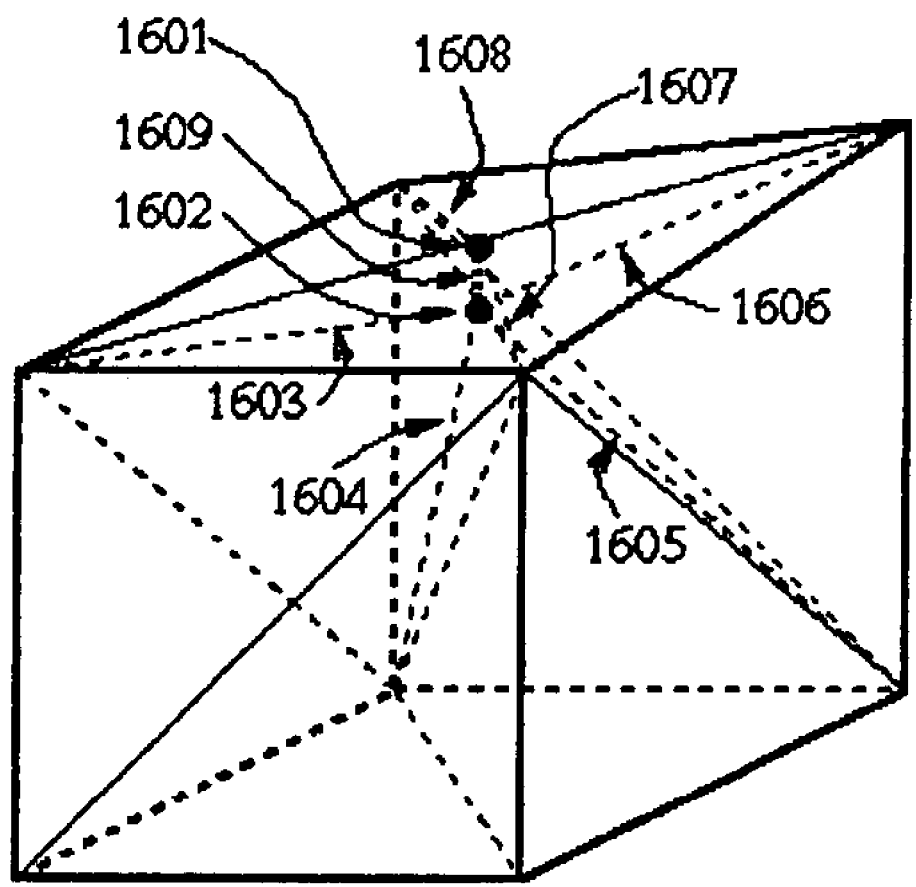

FIGS. 15 and 16 refer to steps 1104 through 1108 of the preferred embodiment, as they apply to proximity edges. For each tetrahedron which has a pair of non-intersecting edges that share a common integer-box, the foot print of the integer grid point onto each of the edges is determined. The edges are split at their respective foot prints. Each triangular face that shared either of the split edges is also split into triangular faces. Further, each tetrahedron which was bound by the split edges gets split into two tetrahedra. Then, an edge is added, connecting the two foot prints. Then, four new faces are created, each sharing the new edge connecting the foot prints, connecting to each of the four vertices of the original tetrahedron. FIG. 15 shows a nearly flat tetrahedron 1501. Edges 1502 and 1503 are considered proximal since they both pass through the integer-grid box 1504.

FIG. 16 shows new foot print vertices 1601 and 1602, along with new edges 1603 through 1608. Edge 1609 connects foot print vertices 1601 and 1602. (New tetrahedra, implied by the wire frame figure, are not labeled for clarity sake).

When the two foot print vertices are snapped to the integer-grid point, one vertex is eliminated, along with four of the tetrahedra. The newly modified vertex 1601 is now on the integer-grid and the nearly flat tetrahedron has been eliminated. The remaining tetrahedra are all well shaped.

Whereas many alterations and modifications of the present invention will no doubt be apparent to a person of ordinary skill in the art after having read the foregoing description, it is to be understood that the particular embodiment shown and described by way of illustration is in no way intended to be considered limiting. Therefore, reference to the detail of the preferred embodiment is not tended to limit the scope of the claims which themselves recite only those features regarded as essential to the invention.

The invention claimed is:

1. A method for preventing spurious intersections in a tetrahedralization of a three-dimensional (3-D) solid object representation due to round-off effects, comprising the steps of:
   a) inputting the 3-D solid object representation with a first order precision with a given limit on the first order precision;
   b) performing the tetrahedralization of said 3-D solid object representation with a second order precision with a given limit, where in said limit on said second order precision being greater than said limit on said first order precision, said tetrahedralization generating a plurality of tetrahedra approximating said 3-D solid object representation;
   c) identifying from the plurality of tetrahedra the tetrahedra showing potential spurious intersections by means of a vertex vicinity region test; wherein said vertex vicinity test comprises identifying at least one vertex which when rounded to said first order precision intersects at least one face of said tetrahedralization;
   d) replacing the identified tetrahedra displaying the potential spurious intersections with other tetrahedra that are devoid of spurious intersections;
   e) converting all of said tetrahedra created by said tetrahedralization from said second order precision to said first order precision;
   f) identifying from the plurality of tetrahedra the tetrahedra showing potential spurious intersections between at least two tetrahedra from said plurality of tetrahedra by means of an edge vicinity region test, where, said edge vicinity test comprising of identifying at least two edges which when rounded to said first order precision intersects with each other;
   g) replacing the identified tetrahedra displaying the potential spurious intersections using said edge vicinity test with other tetrahedra that are devoid of spurious intersections;

h) converting all of said tetrahedra created by said tetrahedralization from said second order precision to said first order precision; and i) outputting with said first order precision said 3-D solid object representation consisting of tetrahedra devoid of spurious intersections.

2. The method as recited in claim 1, wherein obtaining the vertex vicinity region in step c) further comprises the steps of:

a) identifying vertices in said plurality of tetrahedra having coordinates with said second order precision;

b) identifying a vicinity region for each of said plurality of tetrahedra vertices having coordinates with said second order precision;

c) identifying faces and edges of said plurality of tetrahedra intersecting said vicinity regions as having a potential for spurious intersection;

d) identifying vertices among those identified in step a) having vicinity regions being intersected by faces and edges of said plurality of tetrahedra;

e) identifying a set of tetrahedra among from said plurality of tetrahedra that are provided with said faces and edges identified in step c) that intersect said vicinity regions;

f) identifying a set of tetrahedra among said plurality of tetrahedra that are provided with vertices as identified in step d) having vicinity regions being intersected by faces and edges of said plurality of tetrahedra; and g) marking the tetrahedra identified in steps e) and i) as having potential spurious intersections.

3. The method as recited in claim 1, wherein obtaining the edge vicinity region in step f) further comprising the steps of:

a) identifying at least one edge in said plurality of tetrahedra, having at least one of its end-point coordinates with said second order precision;

b) identifying at least another edge in said plurality of tetrahedra, having at least one of its end-point coordinates with said second order precision, and the closest distance between said first edge and the second edge being less than said limit of said first order precision;

c) identifying a set of tetrahedra among said plurality of tetrahedra that are provided with said edges identified in step a) and step b); and d) marking the tetrahedra identified in steps c) as having potential spurious intersections.

4. The method as recited in claim 2, further comprising the steps of:

a) replacing said faces and edges identified in step c) of claim 2 having potential spurious intersections by a plurality of faces and edges devoid of potential spurious intersections;

b) ensuring that said plurality of faces and edges contains at least one vertex defined with said first order precision;

c) creating a set of tetrahedra surrounding said point using said faces and edges that are devoid of potential spurious intersections; and d) replacing the set of tetrahedra marked in step g) of claim 2 by said created set of tetrahedra.

5. The method as recited in claim 2, wherein step b) further comprises the steps of:

a) identifying a point having x, y and z coordinates defined with said first order precision that is closest to each vertex identified in step a) of claim 2;

b) identifying a region surrounding said point having said x, y and z coordinates with said first order precision; and c) identifying said region as a vicinity region as recited in step b) of claim 2.

6. The method as recited in claim 1, wherein step j) further comprises the steps of:

a) adding two additional vertices to said two edges identified using said edge vicinity test at respective locations in the interior of each of said edges wherein said edges are closest to each other; and b) adding an edge to said tetrahedralization, connecting said additional vertices, further splitting four faces of said tetrahedron by connecting said additional vertices to the remaining vertices of said tetrahedron, resulting in a partitioning of the original said tetrahedron into four tetrahedra and a splitting of each of the neighboring tetrahedra.

7. A method with said first order precision generating topological inconsistencies in said final output for extracting parasitic capacitance in an integrated circuit layout comprising the steps of:

a) inputting a 3-D solid object representation with a first order precision with a given limit on the precision;

b) performing the tetrahedralization of said 3-D solid object representation with a second order precision with a given limit, said limit on said second order precision being greater than at least four times said limit on said first order precision, said tetrahedralization generating a plurality of tetrahedra approximating said 3-D solid object representation without any spurious intersection;

c) identifying from said plurality of tetrahedra the tetrahedra showing potential spurious intersections between at least two tetrahedra from said plurality of tetrahedra by means of a vertex vicinity test, said vertex vicinity test identifying at least one vertex which when rounded to said first order precision intersects at least one face of said tetrahedralization;

d) replacing said identified tetrahedra displaying the potential spurious intersections with other tetrahedra that are devoid of spurious intersections;

e) converting all said tetrahedra created by said tetrahedralization from said second order precision to said first order precision; b f) removing any tetrahedron with zero volume from within said converted tetrahedralization with first order precision;

g) identifying from the plurality of tetrahedra the tetrahedra showing potential spurious intersections between at least two tetrahedra from said plurality of tetrahedra by means of an edge vicinity test, said edge vicinity test identifying at least two edges which when rounded to said first order precision intersect with each other;

h) replacing said identified tetrahedra displaying the potential spurious intersections using said edge vicinity test with other tetrahedra that are devoid of spurious intersections;

i) converting all of said tetrahedra created by said tetrahedralization from said second order precision to said first order precision;

j) removing any tetrahedron with zero volume from within said converted tetrahedralization with first order precision; and k) outputting with said first order precision said 3-D solid object representation consisting of tetrahedra devoid of spurious intersections.

8. A method for performing a stress and visual analysis involving computer visualization on moving or stationary 3-D mechanical solid objects comprising the steps of:
 a) inputting a 3-D solid object representation with a first order precision with a given limit on the precision;
 b) performing the tetrahedralization of said 3-D solid object representation with a second order precision with a given limit, said limit on said second order precision being greater than at least four times of said limit on said first order precision, said tetrahedralization generating a plurality of tetrahedra approximating said 3-D solid object representation without any spurious intersections;
 c) identifying from the plurality of tetrahedral, the tetrahedra showing potential spurious intersections between at least two tetrahedra from said plurality of tetrahedra by means of a vertex vicinity test, said vertex vicinity test identifying at least one vertex which when rounded to said first order precision intersects at least one face of said tetrahedralization;
 d) replacing the identified tetrahedra displaying the potential spurious intersections with other tetrahedra that are devoid of spurious intersections;
 e) converting all of said tetrahedra created by said tetrahedralization from said second order precision to said first order precision;
 f) removing any tetrahedron with zero volume from within said converted tetrahedralization with first order precision;
 g) identifying from the plurality of tetrahedra the tetrahedra showing potential spurious intersections between at least two tetrahedra from said plurality of tetrahedra by means of an edge vicinity test, said edge vicinity test identifying at least two edges which when rounded to said first order precision intersects with each other;
 h) replacing the identified tetrahedra displaying the potential spurious intersections using said edge vicinity test with other tetrahedra that are devoid of spurious intersections;
 i) converting all of said tetrahedra created by said tetrahedralization from said second order precision to said first order precision;
 j) removing any tetrahedron with zero volume from within said converted tetrahedralization with first order precision; and
 k) outputting with said first order precision said 3-D solid object representation consisting of tetrahedra devoid of spurious intersections.

9. An article of manufacture comprising a computer-usable medium having computer readable program code means embodied therein for preventing spurious intersections in a tetrahedralization in a 3-D solid object representation due to round-off effects, the computer readable program code means in said article of manufacture comprising:
 a) computer readable program code means for inputting the 3-D solid object representation with a first order precision with a given limit on the precision;
 b) computer readable program code means for performing the tetrahedralization of said 3-D solid object representation with a second order precision with a given limit, said limit on said second order precision being greater than at least four times of said limit on said first order precision, said tetrahedralization generating a plurality of tetrahedra approximating said 3-D solid object representation;
 c) computer readable program code means for identifying from the plurality of tetrahedra the tetrahedra showing potential spurious intersections between at least two tetrahedra from said plurality of tetrahedra by means of a vertex vicinity test, said vertex vicinity test identifying at least one vertex which when rounded to said first order precision intersects at least one face of said tetrahedralization;
 d) computer readable program code means for replacing the identified tetrahedra displaying the potential spurious intersections with other tetrahedra that are devoid of spurious intersections;
 e) computer readable program code means for converting all of said tetrahedra created by said tetrahedralization from said second order precision to said first order precision;
 f) computer readable program code means for removing any tetrahedron with zero volume from within said converted tetrahedralization with first order precision;
 g) computer readable program code means for identifying from the plurality of tetrahedra the tetrahedra showing potential spurious intersections between at least two tetrahedra from said plurality of tetrahedra by means of an edge vicinity test, said edge vicinity test identifying at least two edges which when rounded to said first order precision intersects with each other;
 h) computer readable program code means for replacing the identified tetrahedra displaying the potential spurious intersections using said edge vicinity test with other tetrahedra that are devoid of spurious intersections;
 i) computer readable program code means for converting all of said tetrahedra created by said tetrahedralization from said second order precision to said first order precision;
 j) computer readable program code means for removing any tetrahedron with zero volume from within said converted tetrahedralization with first order precision; and
 k) computer readable program code means for outputting with said first order precision said 3-D solid object representation consisting of tetrahedra devoid of spurious intersections.

10. A program storage device readable by a machine, tangibly embodying a program of instructions executable by the machine to perform a method for preventing spurious intersections in a tetrahedralization a 3-D solid object representation due to round-off effects, said method steps comprising:
 a) inputting the 3-D solid object representation with a first order precision with a given limit on the precision;
 b) performing the tetrahedralization of said 3-D solid object representation with a second order precision with a given limit, where said limit on said second order precision being greater than at least four times of said limit on said first order precision, said tetrahedralization generating a plurality of tetrahedra approximating said 3-D solid object representation without any spurious intersection;
 c) identifying from the plurality of tetrahedra the tetrahedra showing potential spurious intersections between at least two tetrahedra from said plurality of tetrahedra by means of a vertex vicinity test, said vertex vicinity test identifying at least one vertex which when rounded to said first order precision intersects at least one face of said tetrahedralization
 d) replacing the identified tetrahedra displaying the potential spurious intersections with other tetrahedra that are devoid of spurious intersections;

e) converting all of said tetrahedra created by said tetrahedralization from said second order precision to said first order precision;
f) removing any tetrahedron with zero volume from within said converted tetrahedralization with first order precision;
g) identifying from the plurality of tetrahedra the tetrahedra showing potential spurious intersections between at least two tetrahedra from said plurality of tetrahedra by means of an edge vicinity test, said edge vicinity test identifying at least two edges which when rounded to said first order precision intersects with each other;
h) replacing the identified tetrahedra displaying the potential spurious intersections using said edge vicinity test with other tetrahedra that are devoid of spurious intersections;
i) removing any tetrahedron with zero volume from within said converted tetrahedralization with first order precision; and
j) outputting with said first order precision said 3-D solid object representation consisting of tetrahedra devoid of spurious intersections.

11. A method to maintain topological consistency of at least one 3-D tetrahedralization representation of at least one 3-D solid object with numerical precision having at least one limit so that the resulting output is a valid three dimensional tetrahedralization comprising the steps of:
a) inputting the 3-D solid object representation with a first order numerical precision having a given limit;
b) performing the tetrahedralization of said 3-D solid object representation with a second order numerical precision having a given limit, where said given limit of said second order precision being greater than or equal to four times said limit of said first order precision, said tetrahedralization generating a plurality of tetrahedra approximating said 3-D solid object representation;
c) identifying at least one vertex in said plurality of tetrahedra having coordinates with said second order precision;
d) identifying at least one vicinity region for said vertex having coordinates with said second order precision, where said vicinity region is an orthogonal cube centered at said vertex having dimensions equal to said limit of said first order precision;
e) identifying at least one face of said plurality of tetrahedra intersecting said vicinity region as having a potential for spurious intersection;
f) obtaining the closest point on said face intersecting said vicinity region to said vertex having coordinates with said second order precision and assuring said closest point remain within said vicinity region;
g) identifying all three edges forming the boundary of said face intersecting said vicinity region;
h) identifying at least one tetrahedron having said face intersecting said vicinity region on its surface;
i) forming three triangles on said face intersecting said vicinity region by using said three edges forming the boundary of said face and said closest point on said face to said vertex having coordinates with said second order precision;
j) identifying at least one vertex not belonging to said face intersecting said vicinity region, but belonging to said tetrahedron having said face on its surface;
k) forming three new surfaces using said three triangles on said face intersecting said vicinity region, and said vertex in said plurality of tetrahedra having coordinates with said second order precision;
l) forming three new tetrahedra using said new surfaces formed by using said three triangles on said face intersecting said vicinity region; said vertex in said plurality of tetrahedra having coordinates with said second order precision; and said one vertex not belonging to said face intersecting said vicinity region, but belonging to said tetrahedron having said face on its surface;
m) replacing said tetrahedron having said face intersecting said vicinity region on its surface by three new tetrahedra formed by using said new surfaces formed by using said three triangles on said face intersecting said vicinity region, and said vertex in said plurality of tetrahedra having coordinates with said second order precision; and said one vertex not belonging to said face intersecting said vicinity region, but belonging to said tetrahedron having said face on its surface;
o) replacing said vertex in said plurality of tetrahedra having coordinates with said second order precision by the closest point having coordinates in said first order precision;
p) repeating steps c) through o) until there is no vertex in said plurality of tetrahedra having coordinates with said second order precision;
q) removing any tetrahedra not enclosing a positive volume from said plurality of tetrahedra;
r) identifying a pair of edges in said plurality of tetrahedra as mentioned in step q), wherein edges of said pair bound the same tetrahedron and have no common endpoints, yet the interior of said edges are separated by a distance less than the limit of said first order precision;
s) adding two additional vertices to said edges of said pair, at the respective locations in the interior of each of said edges wherein said edges are closest to each other, and adding an edge to said tetrahedralization, connecting said additional vertices; further, splitting the four faces of said tetrahedron by connecting said additional vertices to the remaining vertices of said tetrahedron, resulting in a partitioning of the original said tetrahedron into four tetrahedral and a splitting of each of the neighboring tetrahedral;
t) repeating steps p) through q) until there are no edge pairs in said tetrahedralization wherein the edges have no common endpoints yet are separated by a distance less than the limit of said first order precision;
u) repeating steps c) through o) until no further modifications to said tetrahedralization are made; and
v) removing steps t) through u) until no further modifications to said tetrahedralization are made.

12. The method as recited in claim 11, wherein said tetrahedralization creates an intermediate output by a numerical representation that uses more computer bits than are allowed for the final output as recited in step f).

13. The method as recited in claim 11, wherein said tetrahedralization creates an intermediate output with said first order precision generating topological inconsistencies in said final output.

14. The method as recited in claim 11, wherein said topological inconsistencies in said final output lead to computation failure and erroneous results.

* * * * *